US006960975B1

(12) United States Patent
Volfson (10) Patent No.: US 6,960,975 B1
(45) Date of Patent: Nov. 1, 2005

(54) SPACE VEHICLE PROPELLED BY THE PRESSURE OF INFLATIONARY VACUUM STATE

(76) Inventor: Boris Volfson, 5707 W. Maple Grove Rd., Apt. 3046, Huntington, IN (US) 46750

( * ) Notice: Subject to any disclaimer, the term of this patent is extended or adjusted under 35 U.S.C. 154(b) by 8 days.

(21) Appl. No.: 11/079,670

(22) Filed: Mar. 14, 2005

Related U.S. Application Data (63) Continuation of application No. 10/633,778, filed on Aug. 4, 2003, now abandoned.

(51) Int. Cl.[7] .............................. H01F 6/00; F03H 5/00
(52) U.S. Cl. ..................................... 335/216; 60/200.1
(58) Field of Search ....................... 335/216; 60/200.1

(56) References Cited

U.S. PATENT DOCUMENTS

| 3,626,605 A | 12/1971 | Wallace |
| 3,626,606 A | 12/1971 | Wallace |
| 3,823,570 A | 7/1974 | Wallace |
| 5,197,279 A | 3/1993 | Taylor |
| 6,353,311 B1 | 3/2002 | Brainard et al. |

OTHER PUBLICATIONS

M.T. French, "To the Stars by Electromagnetic Propulsion", http://www.mtjf.demon.co.uk/antigravp2.htm#cforce.
Evgeny Podkletnov, "Weak Gravitational Shielding Properties of Composite Bulk $YBa_2Cu_3O_{(7-x)}$ Superconductor Below 70K Under E.M. Field", LANL database number cond-mat/9701074, v. 3, 10 pages, Sep. 16, 1997.
N. LI & D.G. Torr, "Effects of a Gravitomagnetic Field on Pure Superconductors", Physical Review, vol. 43, p. 457, 3 pages, Jan. 15, 1991.
Evgeny Podkletnov, Giovanni Modanese "Impulse Gravity Generator Based on Charged $YBa_2Cu_3O_{7-y}$ Superconductor with Composite Crystal Structure", arXiv.org/physics database, #0108005 vol. 2, 32 pages, 8 figures, Aug. 30, 2001.
S. Kopeikin & E. Fomalont, "General Relativistic Model for Experimental Measurement of the Speed of Propagation of Gravity by VLBI", Proceedings of the 6th European VLBI Network Symposium Jun. 25-28, 2002, Bonn, Germany, 4 pages.
Sean M. Carroll, "The Cosmological Constant", http://pancake.uchicago.edu/~carroll/encyc/, 6 pages.
Chris Y. Taylor and Giovanni Modanese, "Evaluation of an Impulse Gravity Generator Based Beamed Propulsion Concept", American Institute of Aeronautics and Astronautics, Inc., 2002.
Peter L. Skeggs, "Engineering Analysis of the Podkletnov Gravity Shielding Experiment", Quantum Forum, Nov. 7, 1997, http://www.inetarena'.com/~noetic/pls/podlev.html).

*Primary Examiner*—Ramon M. Barrera (57) ABSTRACT

A space vehicle propelled by the pressure of inflationary vacuum state is provided comprising a hollow superconductive shield, an inner shield, a power source, a support structure, upper and lower means for generating an electromagnetic field, and a flux modulation controller.

A cooled hollow superconductive shield is energized by an electromagnetic field resulting in the quantized vortices of lattice ions projecting a gravitomagnetic field that forms a spacetime curvature anomaly outside the space vehicle. The spacetime curvature imbalance, the spacetime curvature being the same as gravity, provides for the space vehicle's propulsion. The space vehicle, surrounded by the spacetime anomaly, may move at a speed approaching the light-speed characteristic for the modified locale.

13 Claims, 6 Drawing Sheets

SPACE VEHICLE PROPELLED BY THE PRESSURE OF INFLATIONARY VACUUM STATE

CROSS REFERENCE TO RELATED APPLICATIONS

This is a continuation of application Ser. No. 10/633,778 filed on Aug. 4, 2003, now abandoned.

TECHNICAL FIELD

The technical field of this disclosure represents space vehicles propelled by the electro-magnetically changed properties of vacuum, particularly the pressure of inflationary vacuum state.

BACKGROUND OF THE INVENTION

The existence of a magnetic-like gravitational field has been well established by physicists for general relativity, gravitational theories, and cosmology. The consequences of the effect of electromagnetically-affected gravity could be substantial and have many practical applications, particularly in aviation and space exploration.

There are methods known for converting electromagnetism into a propulsive force that potentially generates a large propulsive thrust. According to these methods, the machine thrust is produced by rotating, reciprocating masses in the following ways: centrifugal thrust, momentum thrust, and impulse thrust. ("To the Stars by Electromagnetic Propulsion", M. T. French, http://www.mtjf.demon.co.uk/antigravp2.htm#cforce).

However, the electromagnetic propulsion in an ambient space, or space that is not artificially modified, is not practical for interstellar travel because of the great distances involved. No interstellar travel is feasible without some form of distortion of space. In turn, no alteration of space is possible without the corresponding deformation of time. Gravitomagnetic alteration of space, resulting in the space-time curvature anomaly that could propel the space vehicle, could be a feasible approach to future space travel.

In the late 1940s, H. B. G. Casimir proved that the vacuum is neither particle nor field-free. It is a source of zero-point-fluctuation (ZPF) of fields such as the vacuum gravitomagnetic field. ZPF fields lead to real, measurable physical consequences such as the Casimir force. The quantized hand-made electromagnetic processes, such as those occurring in superconductors, affect the similarly quantized ZPFs. The most likely reason is the electron-positron creation and annihilation, in part corresponding to the "polarization effect" sited by Evgeny Podkletnov in explaining the gravitomagnetic effect reportedly observed by him in 1992. ("Weak Gravitational Shielding Properties of Composite Bulk $YBa_2Cu_3O_{(7-x)}$ Superconductor Below 70 K Under E.M. Field", Evgeny Podkletnov, LANL database number cond-mat/9701074, v. 3, 10 pages, 16 Sep. 1997).

The investigation of gravitomagnetism, however, started well before Podkletnov. In the U.S. Pat. No. 3,626,605, Henry Wm. Wallace describes an experimental apparatus for generating and detecting a secondary gravitational field. He also shows how a time-varying gravitomagnetic field can be used to shield the primary background of a gravitoelectric field.

In the U.S. Pat. No. 3,626,606, Henry Wm. Wallace provides a variation of his earlier experiment. A type III-V semiconductor material, of which both components have unpaired nuclear spin, is used as an electronic detector for the gravitomagnetic field. The experiment demonstrates that the material in his gravitomagnetic field circuit has hysterisis and remanence effects analogous to magnetic materials.

In the U.S. Pat. No. 3,823,570, Henry Wm. Wallace provides an additional variation of his experiment. Wallace demonstrates that, by aligning the nuclear spin of materials having an odd number of nucleons, a change in specific heat occurs.

In the U.S. Pat. No. 5,197,279, James R. Taylor discloses Electromagnetic Propulsion Engine where solenoidal windings generate an electromagnetic field that, without the conversion into a gravitomagnetic field, generates the thrust necessary for the propulsion.

In the U.S. Pat. No. 6,353,311 B1, John P. Brainard et al. offer a controversial theory of Universal Particle Flux Field, and in order to prove it empirically, provide a shaded motor-type device. This device is also intended for extracting energy from this hypothetical Field.

In the early 1980s, Sidney Coleman and F. de Luca noted that the Einsteinean postulate of a homogeneous Universe, while correct in general, ignores quantized local fluctuation of the pressure of inflationary vacuum state, this fluctuation causing local cosmic calamities. While the massless particles propagate through large portions of Universe at light speed, these anomaly bubbles, depending on their low or high relative vacuum density, cause a local increase or decrease of the propagation values for these particles. Scientists disagree about the possibility, and possible ways, to artificially create models of such anomalies.

In the early 1990s, Ning Li and D. G Torr described a method and means for converting an electromagnetic field into a gravitomagnetic field. Li and Torr suggested that, under the proper conditions, the minuscule force fields of superconducting atoms can "couple", compounding in strength to the point where they can produce a repulsion force ("Effects of a Gravitomagnetic Field on Pure Superconductors", N. Li and D. G. Torr, Physical Review, Volume 43, Page 457, 3 pages, 15 Jan. 1991).

A series of experiments, performed in the early 1990s by Podkletnov and R. Nieminen, reportedly resulted in a reduction of the weights of objects placed above a levitating, rotating superconductive disk subjected to high frequency magnetic fields. These results substantially support the expansion of Einstainean physics offered by Li & Torr. Podkletnov and Giovanni Modanese have provided a number of interesting theories as to why the weight reduction effect could have occurred, citing quantum gravitational effects, specifically, a local change in the cosmological constant. The cosmological constant, under ordinary circumstances, is the same everywhere. But, according to Podkletnov and Modanese, above a levitating, rotating superconductive disk exposed to high frequency magnetic fields, it is modified. ("Impulse Gravity Generator Based on Charged $YBa_2Cu_3O_{7-y}$ Superconductor with Composite Crystal Structure", Evgeny Podkletnov, Giovanni Modanese, arXiv.org/physics database, #0108005 volume 2, 32 pages, 8 figures, Aug. 30, 2001).

In the July 2004 paper, Ning Wu hypothesized that exponential decay of the gravitation gauge field, characteristic for the unstable vacuum such as that created by Podkletnov and Nieminen, is at the root of the gravitational shielding effects (Gravitational Shielding Effects in Gauge Theory of Gravity, Ning Wu, arXiv:hep-th/ 0307225 v 1 23 Jul. 2003, 38 pages incl. 3 figures, July 2004).

In 2002, Edward Fomalont and Sergei Kopeikin measured the speed of propagation of gravity. They confirmed that the speed of propagation of gravity matches the speed of light. ("General Relativistic Model for Experimental Measurement of the Speed of Propagation of Gravity by VLBI", S. Kopeikin and E. Fomalont, Proceedings of the 6$^{th}$ European VLBI Network Symposium Jun. 25–28 2002, Bonn, Germany, 4 pages).

String theory unifies gravity with all other known forces. According to String theory, all interactions are carried by fundamental particles, and all particles are just tiny loops of space itself forming the spacetime curvature. Gravity and bent space are the same thing, propagating with the speed of light characteristic of the particular curvature. In light of the Fomalont and Kopeikin discovery, one can conclude that if there is a change in the speed of propagation of gravity within the spacetime curvature, then the speed of light within the locality would also be affected.

In general relativity, any form of energy affects the gravitational field, so the vacuum energy density becomes a potentially crucial ingredient. Traditionally, the vacuum is assumed to be the same everywhere in the Universe, so the vacuum energy density is a universal number. The cosmological constant $\Lambda$ is proportional to the vacuum pressure $\rho_\Lambda$: $\Lambda=(8\pi G/3c^2)\rho_\Lambda$, where G is Newton's constant of gravitation and c is the speed of light ("The Cosmological Constant", Sean M. Carroll, http://pancake.uchicago.edu/~carroll/encyc/, 6 pages). Newer theories, however, permit local vacuum fluctuations where even the "universal" constants are affected: $\Lambda_1=(8\pi G_1/3c_1^2)\rho_{\Lambda_1}$.

Analyzing physics laws defining the cosmological constant, a conclusion can be drawn that, if a levitating, rotating superconductive disk subjected to high frequency magnetic fields affects the cosmological constant within a locality, it would also affect the vacuum energy density. According to the general relativity theory, the gravitational attraction is explained as the result of the curvature of spacetime being proportional to the cosmological constant. Thus, the change in the gravitational attraction of the vacuum's subatomic particles would cause a local anomaly in the curvature of the Einsteinean spacetime.

Time is the fourth dimension. Lorentz and Einstein showed that space and time are intrinsically related. Later in his life, Einstein hypothesized that time fluctuates both locally and universally. Ruggero Santilli, recognized for expanding relativity theory, has developed the isocosmology theory, which allows for variable rates of time. Time is also a force field only detected at speeds above light speed. The energy of this force field grows as its propagation speed declines when approaching light-speed. Not just any light-speed: the light-speed of a locale. If the conditions of the locale were modified, this change would affect the local time rate relative to the rate outside the affected locale, or ambient rate. The electromagnetically-generated gravitomagnetic field could be one such locale modifier.

Analyzing the expansion of Einstainean physics offered by Li & Torr, one could conclude that gravity, time, and light speed could be altered by the application of electromagnetic force to a superconductor.

By creating a spacetime curvature anomaly associated with lowered pressure of inflationary vacuum state around a space vehicle, with the lowest vacuum pressure density located directly in front of the vehicle, a condition could be created where gravity associated with lowered vacuum pressure density pulls the vehicle forward in modified spacetime.

By creating a spacetime curvature anomaly associated with elevated pressure of inflationary vacuum state around the space vehicle, with the point of highest vacuum pressure density located directly behind the vehicle, a condition could be created where a repulsion force associated with elevated vacuum pressure density pushes the space vehicle forward in modified spacetime. From the above-mentioned cosmological constant equation, re-written as:

$$\rho_\Lambda = \frac{3c^2}{8\pi G}\Lambda$$

it is clear that the increase in the vacuum pressure density could lead to a substantial increase in the light-speed. If the space vehicle is moving in the anomaly where the local light-speed is higher than the light-speed of the ambient vacuum, and if this vehicle approaches this local light-speed, the space vehicle would then possibly exceed the light-speed characteristic for the ambient area.

The levitating and rotating superconductor disk, which Podkletnov used to protect the object of experiment from the attraction produced by the energy of the vacuum, was externally energized by the externally-powered solenoid coils. Thus, Podkletnov's system is stationary by definition and not suitable for travel in air or space. Even if the superconductive disk is made part of the craft, and if it is energized by the energy available on the craft, the resulting anomaly is one-sided, not enveloping, and not providing the variable speed of light (VSL) environment for the craft.

In a recent (2002) article, Chris Y. Tailor and Modanese propose to employ an impulse gravity generator directing, from an outside location, an anomalous beam toward a spacecraft, this beam acting as a repulsion force field producing propulsion for the spacecraft. ("Evaluation of an Impulse Gravity Generator Based Beamed Propulsion Concept", Chris Y. Taylor and Giovanni Modanese, American Institute of Aeronautics and Astronautics, Inc., 2002, 21 pages, 10 figures). The authors of the article, however, didn't take into account the powerful quantized processes of field dispersion, which would greatly limit the distance of propagation of the repulsive force. At best, the implementation of this concept could assist in acceleration and deceleration at short distances from the impulse gravity generator, and only along a straight line of travel. If the travel goal is a space exploration mission rather than the shuttle-like commute, the proposed system is of little use.

Only a self-sufficient craft, equipped with the internal gravity generator and the internal energy source powering this generator, would have the flexibility needed to explore new frontiers of space. The modification of the spacetime curvature all around the spacecraft would allow the spacecraft to approach the light-speed characteristic for the modified locale, this light-speed, when observed from a location in the ambient space, being potentially many times higher than the ambient light-speed. Then, under sufficient local energies, that is, energies available on the spacecraft, very large intergalactic distances could be reduced to conventional planetary distances.

In "The First Men in the Moon" (1903), H. G. Wells anticipates gravitational propulsion methods when he describes gravity repelling "cavorite." Discovered by Professor Cavor, the material acts as a "gravity shield" allowing Cavor's vehicle to reach the Moon. Prof. Cavor built a large spherical gondola surrounded on all sides by cavorite shutters that could be closed or opened. When Prof. Cavor closed all the shutters facing the ground and opened the shutters facing the moon, the gondola took off for the Moon.

Until today, no cavorite has been discovered. However, recent research in the area of superconductivity, nanomaterials and quantum state of vacuum, including that of Li, Torr, Podkletnov, and Modanese, has resulted in important new information about the interaction between a gravitational field and special states of matter at a quantum level. This new research opens the possibility of using new electromagnetically-energized superconductive materials allowing stable states of energy, the materials useful not only in controlling the local gravitational fields, but also in creating new gravitomagnetic fields.

BACKGROUND OF INVENTION: OBJECTS AND ADVANTAGES

There are four objects of this invention:

The first object is to provide a method for generating a pressure anomaly of inflationary vacuum state that leads to electromagnetic propulsion.

The second object is to provide a space vehicle capable of electromagnetically-generated propulsion. The implementation of these two objects leads to the development of the space vehicle propelled by gravitational imbalance with gravity pulling, and/or antigravity pushing, the space vehicle forward.

The third object is to provide a method for generating a pressure anomaly of inflationary vacuum state, specifically, the local increase in the level of vacuum pressure density associated with the greater curvature of spacetime. The speed of light in such an anomaly would be higher than the speed of light in the ambient space.

The fourth object is to provide the space vehicle capable of generating an unequally-distributed external anomaly all around this vehicle, specifically the anomaly with the elevated level of vacuum pressure density. The anomaly is formed in such a way that gravity pulls the space vehicle forward in the modified spacetime at a speed possibly approaching the light-speed specific for this modified locale. If the vacuum pressure density of the locale is modified to be substantially higher than that of the ambient vacuum, the speed of the vehicle could conceivably be higher than the ambient light-speed.

SUMMARY OF THE INVENTION

This invention concerns devices self-propelled by the artificially changed properties of the pressure of inflationary vacuum state to speeds possibly approaching the light-speed specific for this modified locale. Furthermore, this invention concerns devices capable of generating the spacetime anomaly characterized by the elevated vacuum pressure density. The devices combining these capabilities may be able to move at speeds substantially higher than the light-speed in the ambient space.

The device of this invention is a space vehicle. The outside shell of the space vehicle is formed by a hollow disk, sphere, or the like hollowed 3-dimensional shape made of a superconductor material, hereinafter a hollow superconductive shield. An inner shield is disposed inside the hollow superconductive shield. The inner shield is provided to protect crew and life-support equipment inside.

A support structure, upper means for generating an electromagnetic field and lower means for generating an electromagnetic field are disposed between the hollow superconductive shield and the inner shield. A flux modulation controller is disposed inside the inner shield to be accessible to the crew.

Electrical energy is generated in a power source disposed inside the hollow superconductive shield. The electrical energy is converted into an electromagnetic field in the upper means for generating an electromagnetic field and the lower means for generating an electromagnetic field.

Electrical motors, also disposed inside the hollow superconductive shield, convert the electrical energy into mechanical energy.

The mechanical energy and the electromagnetic field rotate the hollow superconductive shield, and the upper and the lower means for generating an electromagnetic field, against each other.

The electromagnetic field is converted into a gravitomagnetic field in the hollow superconductive shield.

The gravitomagnetic field, propagated outward, orthogonally to the walls of the hollow superconductive shield, forms a pressure anomaly of inflationary vacuum state in the area of propagation. The pressure anomaly of inflationary vacuum state is comprised of an area of relatively lower vacuum pressure density in front of the space vehicle and an area of relatively higher vacuum pressure density behind the vehicle.

The difference in the vacuum pressure density propels the space vehicle of this invention forward.

DRAWINGS—REFERENCE NUMERALS 1 hollow superconductive shield
2 inner shield
3 upper shell
4 lower shell
5 support structure
6 upper rotating element
7 lower rotating element
8 upper means for generating an electromagnetic field
9 lower means for generating an electromagnetic field
10 flux lines
11 power source 12 life-support equipment
13 flux modulation controller
14 crew
15 clockwise shield motion vector
16 counterclockwise EMF motion vector
17 wire grid
18 clockwise quantized vortices of lattice ions
19 outward gravitomagnetic field vector
20 counterclockwise shield motion vector
21 clockwise EMF motion vector
22 counterclockwise quantized vortices of lattice ions
23 inward gravitomagnetic field vector
24 vacuum pressure density anomaly associated with lowered pressure of inflationary vacuum state
25 Universal curvature of inflationary vacuum state
26 vacuum pressure density anomaly associated with elevated pressure of inflationary vacuum state
27 spacetime anomaly associated with lowered pressure of inflationary vacuum state
28 spacetime anomaly associated with elevated pressure of inflationary vacuum state
29 Universal spacetime
30 substantially droplet-shaped spacetime curvature anomaly associated with lowered pressure of inflationary vacuum state
31 substantially droplet-shaped spacetime anomaly associated with elevated pressure of inflationary vacuum state
32 substantially egg-shaped spacetime anomaly associated with lowered pressure of inflationary vacuum state
33 area of the lowest vacuum pressure density
34 substantially egg-shaped spacetime anomaly associated with elevated pressure of inflationary vacuum state
35 area of the highest vacuum pressure density

DESCRIPTION OF THE PRESENTLY PREFERRED EMBODIMENT

Figure 1:
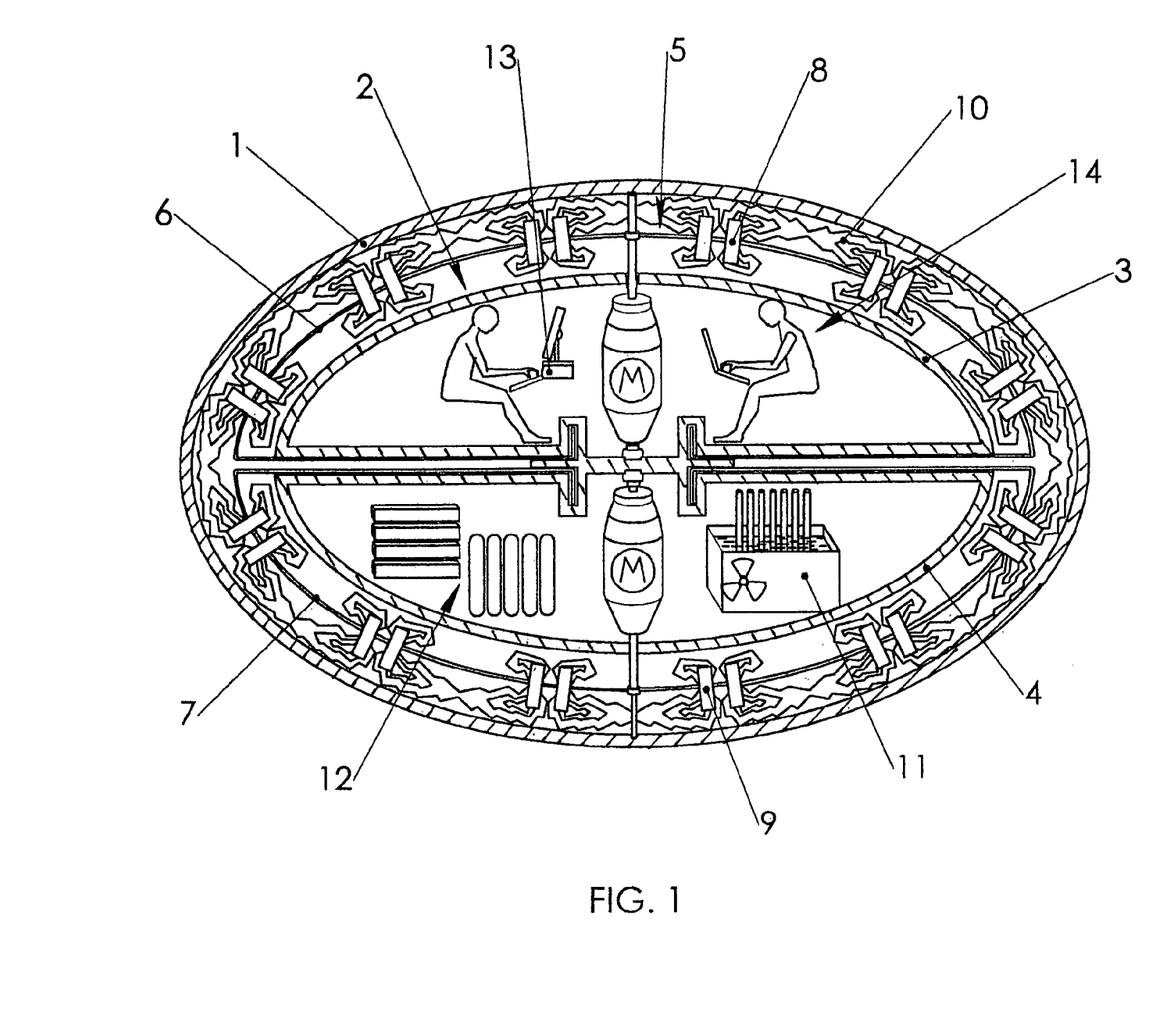
FIG. 1 is a cross-sectional view through the front plane taken along the central axis of a space vehicle provided by the method and device of this invention.

FIG. 1 is a cross-sectional view through the front plane taken along the central axis of a space vehicle provided by the method and device of this invention. A hollow superconductive shield 1 forms a protective outer shell of the space vehicle. The hollow superconductive shield 1 may be shaped as a hollow disk, sphere, or the like 3-dimensional geometrical figure formed by the 2-dimensional rotation of a curve around the central axis.

In the preferred embodiment, the hollow superconductive shield 1 is made of a superconductor such as YBa2Cu3O7-y, or a like high-temperature superconductor with a composite crystal structure cooled to the temperature of about 40 degrees K. The skilled in the art may envision the use of many other low- and high-temperature superconductors, all within the scope of this invention.

An inner shield 2 is disposed inside the hollow superconductive shield 1. The inner shield 2 is comprised of an upper shell 3 and a lower shell 4, the shells 3 and 4 adjoined with each other. Executed from insulation materials such as foamed ceramics, the inner shield 2 protects the environment within the shield from the electromagnetic field and severe temperatures.

A support structure 5 is disposed between the hollow superconductive shield 1 and the inner shield 2, concentric to the hollow superconductive shield. The support structure 5 is comprised of an upper rotating element 6 and a lower rotating element 7.

The upper rotating element 6 is pivotably disposed inside the hollow superconductive shield 1 and may envelope the upper shell 3. The lower rotating element 7 is pivotably disposed inside the hollow superconductive shield 1 and may envelope the lower shell 4. Even though the preferred embodiment has two rotating elements, a skilled in the art may envision only one rotating element, or three or more rotation elements, all within the scope of this invention.

Upper means for generating an electromagnetic field 8 are disposed between the hollow superconductive shield 1 and the upper shell 3. The upper means for generating an electromagnetic field 8 are affixed to the upper rotating element 6 at an electromagnetic field-penetrable distance to the hollow superconductive shield 1.

Lower means for generating an electromagnetic field 9 are disposed between the hollow superconductive shield 1 and the lower shell 4. The lower means for generating an electromagnetic field 9 are affixed to the lower rotating element 7 at an electromagnetic field-penetrable distance to the hollow superconductive shield 1.

The upper means for generating an electromagnetic field 8 and the lower means for generating an electromagnetic field 9 could be solenoid coils or electromagnets. In the process of operation of the space vehicle, the electromagnetic field identified by flux lines 10, is controllably and variably applied to the hollow superconductive shield 1.

Electric motors are disposed inside the hollow superconductive shield along its central axis.

A power source 11 is disposed inside the hollow superconductive shield 1 and may be disposed inside the lower shell 4. The power source 11 is electrically connected with the upper means for generating an electromagnetic field 8, the lower means for generating an electromagnetic field 9, and the electric motors. In-turn, the upper means for generating an electromagnetic field 8, the lower means for generating an electromagnetic field 9, and the electric motors provide for the rotation of the upper rotating element 6 and the lower rotating element 7. The power source 11 may be executed as a nuclear power generator.

Life-support equipment 12 is disposed inside the inner shield 2, and may be disposed inside the lower shell 4. The life-support equipment 12 may include oxygen, water, and food.

A flux modulation controller 13 is disposed inside the inner shield 2, and may be disposed inside the upper shell 3. The flux modulation controller 13 is in communication with the upper means for generating an electromagnetic field 8, the lower means for generating an electromagnetic field 9, the power source 11, and the electric motors.

The flux modulation controller 8 may be executed as a computer or a microprocessor. The flux modulation controller 8 is provided with a capability of modulating the performance parameters of the upper means for generating an electromagnetic field 8, the lower means for generating an electromagnetic field 9, the power source 11, and the electric motors.

A crew 14 may be located inside the upper shell 3 of the inner shield 2 and may consist of one or more astronauts. The crew has a free access to the life-support equipment 12 and the flux modulation controller 8. A skilled in the art may envision a fully-automated, pilotless craft, which is also within the scope of this invention.

A skilled in the art may also envision the embodiment (not shown), also within the scope of this invention, where the hollow superconductive shield is pivotable, and the support structure with the means for generating an electromagnetic field is affixed on the outside of the inner shield.

Figure 2A:
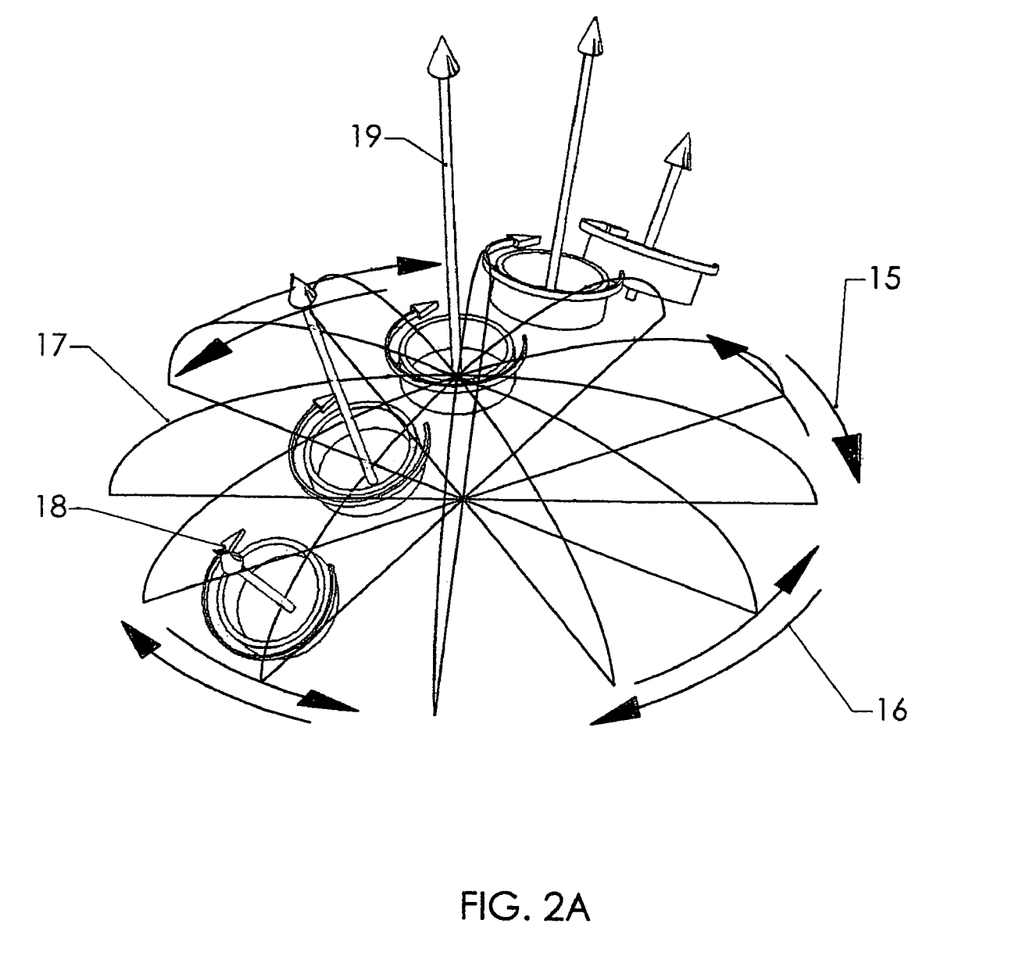
FIGS. 2A & 2B are diagrams, presented as perspective views, showing some of the physical processes resulting from a dynamic application of an electromagnetic field to a hollow superconductive shield. Only one line of quantized vortices, shown out of scale, is presented for illustration purposes.
Figure 2B:
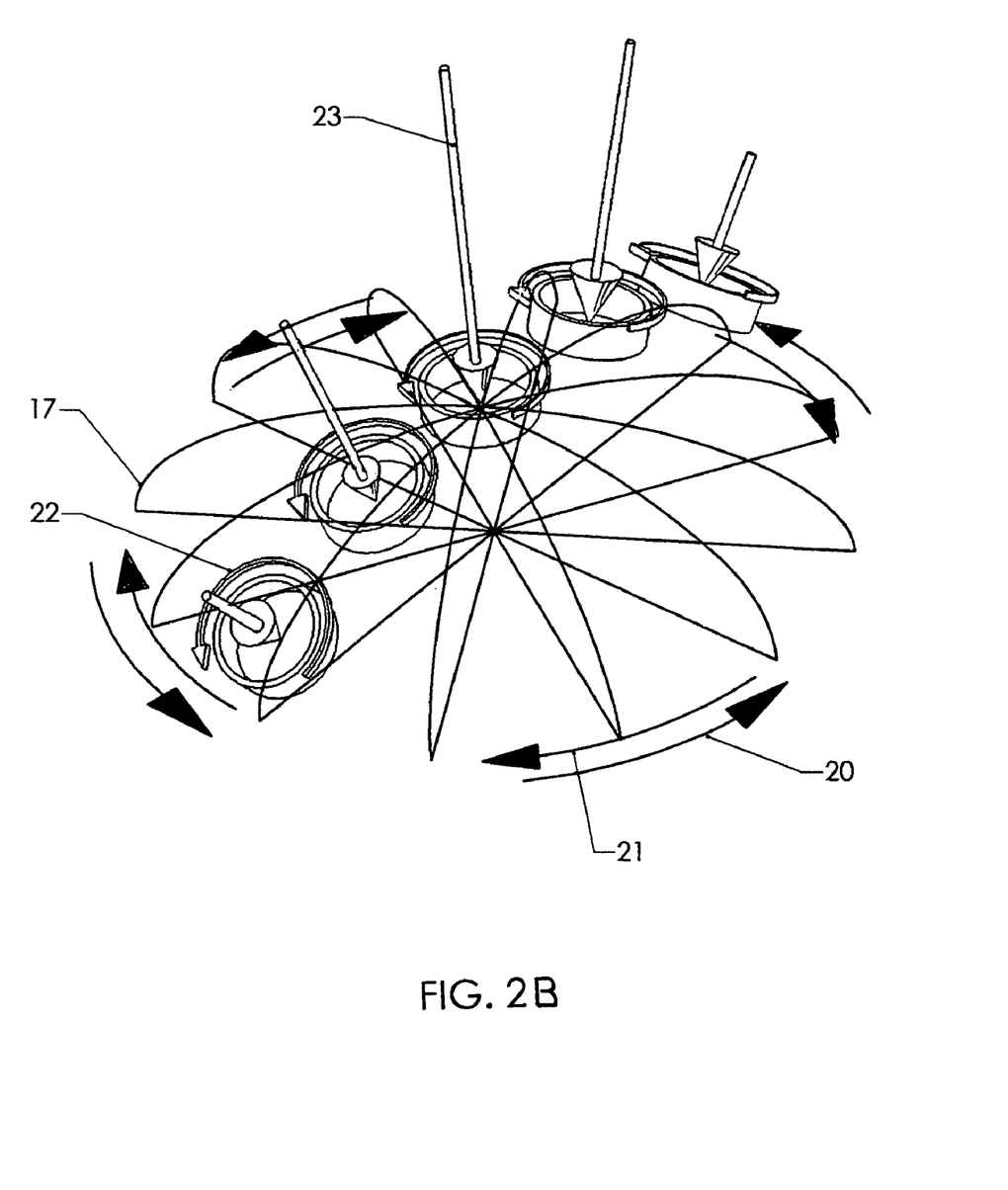

FIGS. 2A & 2B are diagrams showing the results of the quantized electromagnetic turbulence within the superconductive shell of the hollow superconductive shield provided by the relative rotational motion of the hollow superconductive shield against the upper means for generating an electromagnetic field.

FIG. 2A shows the clockwise relative rotational motion of the hollow superconductive shield, this motion identified by a clockwise shield motion vector 15, and the counterclockwise relative rotational motion of upper means for generating an electromagnetic field, this motion identified by a counterclockwise EMF motion vector 16.

The electromagnetic field, controllably and variably applied by the upper means for generating an electromagnetic field, whose various positions are identified by a wire grid 17, to the hollow superconductive shield (not shown), causes quantized electromagnetic turbulence within the hollow superconductive shield. This turbulence is represented by a plurality of clockwise quantized vortices of lattice ions 18. Only one line of the clockwise quantized vortices of lattice ions 18, out of scale, is shown for illustration purposes only. Each of the clockwise quantized vortices of lattice ions 18 generates a gravitomagnetic field identified by an outward gravitomagnetic field vector 19 directed orthogonally away from the hollow superconductive shield.

FIG. 2B shows the counterclockwise relative rotational motion of the hollow superconductive shield, this motion identified by a counterclockwise shield motion vector 20, and the clockwise relative rotational motion of upper means for generating an electromagnetic field, this motion identified by a clockwise EMF motion vector 21.

The electromagnetic field, controllably and variably applied by the upper means for generating an electromagnetic field identified by the wire grid 17, to the hollow superconductive shield (not shown), causes quantized electromagnetic turbulence within the hollow superconductive shield, this turbulence represented by a plurality of counterclockwise quantized vortices of lattice ions 22. Only one line of the counterclockwise quantized vortices of lattice ions 22, out of scale, is shown for illustration purposes only. Each of the counterclockwise quantized vortices of lattice ions 22 generates a gravitomagnetic field identified by an inward gravitomagnetic field vector 23 directed orthogonally toward the hollow superconductive shield.

The electrical requirements for providing the Li-Torr effect are as follows:

Podkletnov has reported using the high frequency current of $10^5$ Hz. He also used 6 solenoid coils @ 850 Gauss each. The reported system's efficiency reached 100% and the total field in the Podkletnov's disk was about 0.5 Tesla. The maximum weight loss reported by Podkletnov was 2.1%.

The preferred embodiment of the device of current invention is capable of housing 2–3 astronauts and therefore is envisioned to be about 5 meters in diameter at the widest point. The preferred space vehicle's acceleration is set at 9.8 m/s/s providing that gravity on board is similar to that on the surface of Earth.

The means for generating an electromagnetic field may be comprised of 124 solenoid coils. At the same 100% efficiency reported by Podkletnov, the total field required providing the acceleration of 9.8 m/s/s is 5,000 Tesla, or about 40 Tesla per coil. Skeggs suggests that on the Podkletnov device, out of 850 Gauss developed on the coil surface, the field affecting the superconductor and causing the gravitomagnetism is only 400 Gauss ("Engineering Analysis of the Podkletnov Gravity Shielding Experiment, Peter L. Skeggs, Quantum Forum, Nov. 7, 1997, http://www.inetarena.com/~noetic/pls/podlev.html, 7 pages). This translates into 47% device efficiency.

In this 47%-efficient space vehicle, the total field required achieving the 9.8 m/s/s acceleration is about 10,600 Tesla, or 85.5 Tesla per each of 124 solenoid coils. It must be noted that at this acceleration rate, it would take nearly a year for the space vehicle to reach the speed of light.

It also must be noted that Skeggs has detected a discrepancy between the Li-Torr estimates and Podkletnov's practical results. If Podkletnov's experimental results are erroneous while the Li-Torr estimates are indeed applicable to the space vehicle of this invention, then the energy requirements for achieving the sought speed would be substantially higher than the above estimate of 10,600 Tesla.

Podkletnov has concluded that, in order for the vacuum pressure density anomaly to take place, the Earth-bound device must be in the condition of Meissner levitation. As are all space bodies, the space vehicle is a subject to the pressure inflationary vacuum state and the gravitational force, which, within the migrating locality of the expanding Universe, in any single linear direction, are substantially in equilibrium. Thus, for the space vehicle, the requirement of Meissner levitation is waved.

The propagation of the gravitomagnetic field identified by the outward gravitomagnetic field vector 19 and the inward gravitomagnetic field vector 23 would cause exotic quantized processes in the vacuum's subatomic particles that include particle polarization, ZPF field defects, and the matter-energy transformation per $E=mc^2$. The combination of these processes would result in the gravitational anomaly. According to the general relativity theory, gravitational attraction is explained as the result of the curvature of spacetime being proportional to the gravitational constant. Thus, the change in the gravitational attraction of the vacuum's subatomic particles would cause a local anomaly in the curvature of the Einsteinean spacetime.

Gravity is the same thing as bent space, propagating with the speed of light characteristic for the particular spacetime curvature. When bent space is affected, there is a change in the speed of propagation of gravity within the spacetime curvature anomaly. The local speed of light, according to Fomalont and Kopeikin always equal to the local speed of propagation of gravity, is also affected within the locality of spacetime curvature anomaly.

Creation of spacetime curvature anomalies adjacent to, or around, the space vehicle, these anomalies characterized by the local gravity and light-speed change, has been the main object of this invention.

Figure 3A:
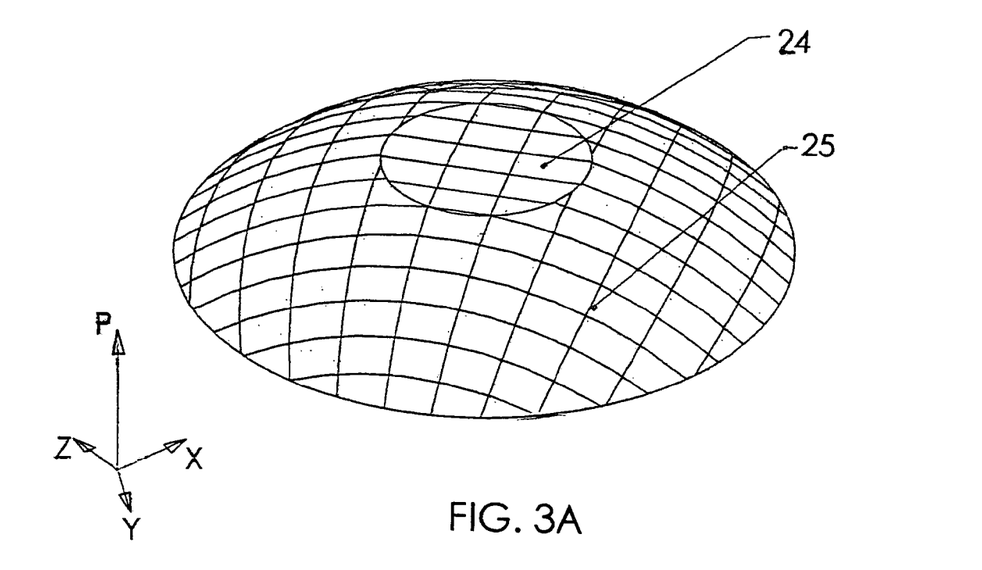
FIGS. 3A & 3B are diagrams, presented as perspective views, showing a vacuum pressure density anomaly associated with lowered pressure of inflationary vacuum state and a vacuum pressure density anomaly associated with elevated pressure of inflationary vacuum state, respectively. Both anomalies are shown on the background of Universal curvature of inflationary vacuum state.

FIG. 3A shows a diagram of a vacuum pressure density anomaly associated with lowered pressure of inflationary vacuum state 24 on the background of Universal curvature of inflationary vacuum state 25. The vacuum pressure density anomaly associated with lowered pressure of inflationary vacuum state 24 is formed by a multitude of the inward gravitomagnetic field vectors. According to the cosmological constant equation, $\Lambda=(8\pi G/3c^2)\rho_A$, where the cosmological constant $\Lambda$ is proportional to the vacuum energy pressure $\rho_A$, G is Newton's constant of gravitation, and c is the speed of light, the curvature of spacetime is proportional to the gravitational constant. According to the general relativity theory, the change in the vacuum pressure density is proportional to the change in the spacetime curvature anomaly. By replacing $\rho_A$ with the vacuum pressure density, P times the vacuum energy coefficient $\kappa$, and replacing c with $\Delta$distance/$\Delta$time, we derive to $\Lambda=[8\pi G/3(\Delta\text{distance}/\Delta\text{time})^2]P_\kappa$, and could now construct a vacuum pressure density curvature diagram.

The vacuum pressure density curvature anomaly associated with lowered pressure of inflationary vacuum state 24 is shown here as a flattened surface representing the lowered pressure of the inflationary vacuum state. This anomaly is the result of the exotic quantized processes in the subatomic particles caused by the quantized turbulence occurring in the hollow superconductive shield. The XYZ axes represent three dimensions of space and the P axis represents the vacuum pressure density.

Figure 3B:
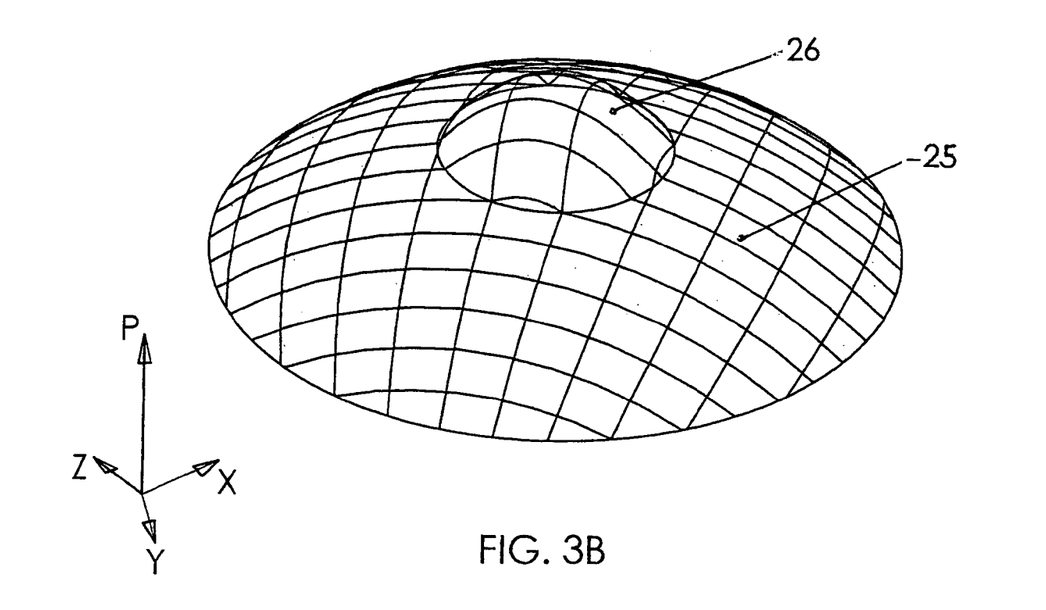

FIG. 3B shows a diagram of a vacuum pressure density anomaly associated with elevated pressure of inflationary vacuum state 26 on the background of the Universal curvature of inflationary vacuum state 25. The vacuum pressure density anomaly associated with elevated pressure of inflationary vacuum state 26 is formed by a multitude of the outward gravitomagnetic field vectors. The anomaly is shown here as a convex surface representing the elevated pressure of inflationary vacuum state. The diagrams of FIGS. 3A & 3B are not to scale: the anomaly sizes are exaggerated for clarity.

Figure 4A:
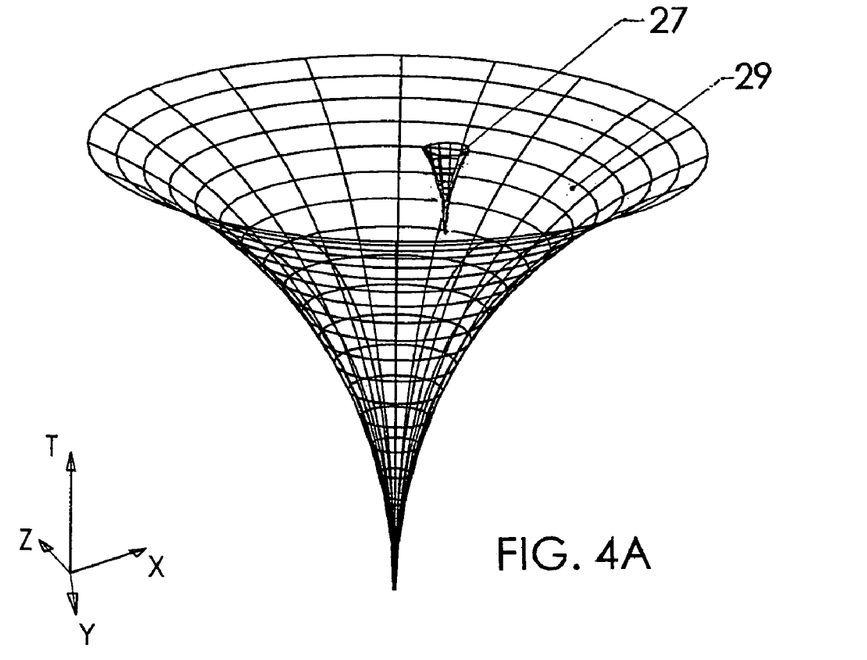
FIGS. 4A & 4B are diagrams, presented as perspective views, showing a spacetime anomaly associated with lowered pressure of inflationary vacuum state and a spacetime anomaly associated with elevated pressure of inflationary vacuum state, respectively. Both anomalies are shown on the background of Universal spacetime.
Figure 4B:
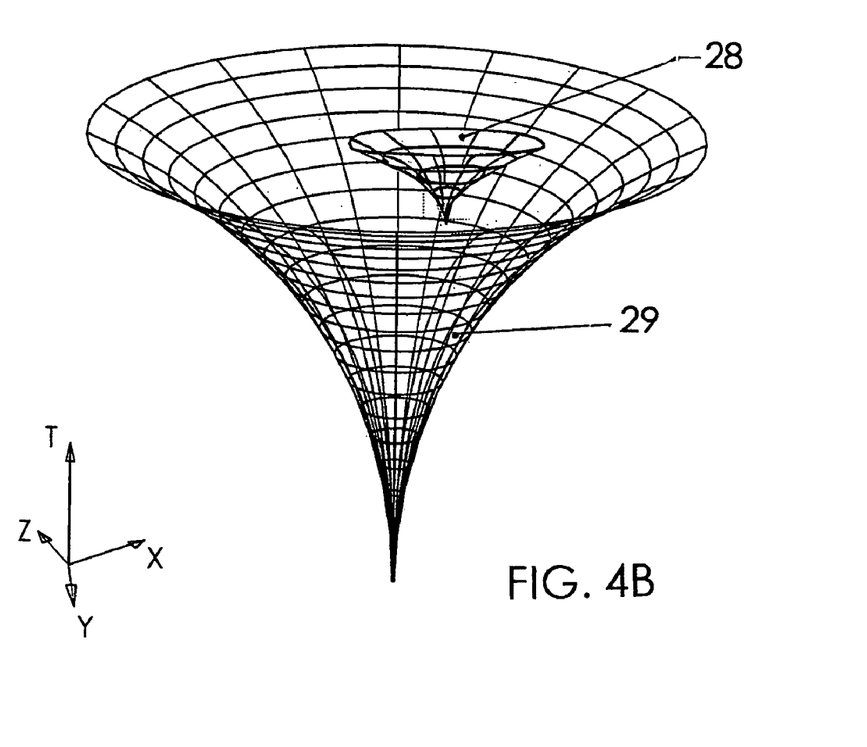

FIGS. 4A & 4B show diagrams of a spacetime anomaly associated with lowered pressure of inflationary vacuum state 27, and a spacetime anomaly associated with elevated pressure of inflationary vacuum state 28, respectively, each on the background a diagram of Universal spacetime 29.

The quaterized Julia set $Q_{n+1}=Q_n^2+C_0$ is assumed to be an accurate mathematical representation of the Universal spacetime. The generic quaternion $Q_0$ belongs to the Julia set associated with the quaternion C, and n tends to infinity. If we assume that the quaternion value $C_0$ is associated with the Universal spacetime 29, $C_1$ is the value of quaternion C for the spacetime anomaly associated with lowered pressure of inflationary vacuum state 27, and $C_2$ is the value of quaternion C for the spacetime anomaly associated with elevated pressure of inflationary vacuum state 28, then we can construct two diagrams.

The diagram of FIG. 4A shows the spacetime anomaly associated with lowered pressure of inflationary vacuum state 27 as a quaterized Julia set contained in a 4-dimensional space: $Q_{n+1}=Q_n^2+C_1$ on the background of the Universal spacetime 29 represented by $Q_{n+1}=Q_n^2+C_0$.

The diagram of FIG. 4B shows the spacetime anomaly associated with elevated pressure of inflationary vacuum state 28 as a quaterized Julia set $Q_{n+1}=Q_n^2+C_2$, also on the background of the Universal spacetime 29 represented by $Q_{n+1}=Q_n^2+C_0$. On both diagrams, the XYZ axes represent three dimensions of space, and the T axis represents time. The diagrams are not to scale: the anomaly sizes are exaggerated for clarity, and the halves of quaterized Julia sets, conventionally associated with the hypothetical Anti-Universe, are omitted.

FIGS. 5A, 5B, 6, 7A, & 7B show simplified diagrams of spacetime curvature anomalies generated by the space vehicle of the current invention, these anomalies providing for the propulsion of the space vehicle. In each case, the pressure anomaly of inflationary vacuum state is comprised of an area of relatively lower vacuum pressure density in front of the space vehicle and an area of relatively higher vacuum pressure density behind the space vehicle. Because the lower pressure of inflationary vacuum state is associated with greater gravity and the higher pressure is associated with the higher repulsive force, the space vehicle is urged to move from the area of relatively higher vacuum pressure density toward the area of relatively lower vacuum pressure density.

Figure 5A:
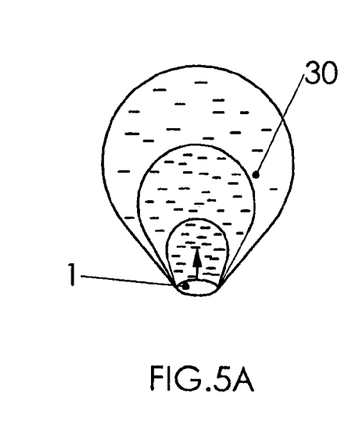
FIGS. 5A, 5B, 6, 7A, & 7B are diagrams of spacetime curvature anomalies generated by the space vehicle of the current invention, these anomalies providing for the propulsion of the space vehicle.

FIG. 5A illustrates the first example of spacetime curvature modification. This example shows a substantially droplet-shaped spacetime curvature anomaly associated with lowered pressure of inflationary vacuum state 30 adjacent to the hollow superconductive shield 1 of the space vehicle. The anomaly 30 is provided by the propagation of a gravitomagnetic field radiating orthogonally away from the front of the hollow superconductive shield 1. This gravitomagnetic field may be provided by the relative clockwise motion of the upper means for generating an electromagnetic field, and relative counterclockwise motion of the hollow superconductive field, as observed from above the space vehicle.

In this example, the difference between the spacetime curvature within the substantially droplet-shaped spacetime anomaly associated with lowered pressure of inflationary vacuum state, and the ambient spacetime curvature, the spacetime curvature being the same as gravity, results in the gravitational imbalance, with gravity pulling the space vehicle forward.

Figure 5B:
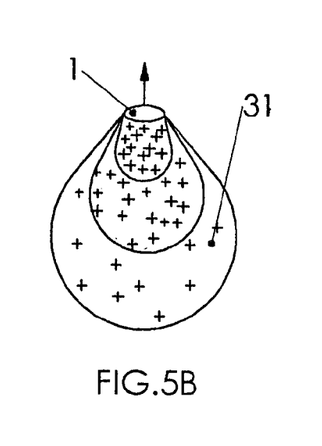

FIG. 5B illustrates the second example of spacetime curvature modification. This example shows a substantially droplet-shaped spacetime anomaly associated with elevated pressure of inflationary vacuum state 31 adjacent to the hollow superconductive shield 1 of the space vehicle. The anomaly 31 is provided by the propagation of a gravitomagnetic field radiating orthogonally away from the back of the hollow superconductive shield. This gravitomagnetic field may be provided by the relative counterclockwise motion of the lower means for generating an electromagnetic field, and relative clockwise motion of the hollow superconductive field, as observed from below the space vehicle.

In this example, the difference between the spacetime curvature within the substantially droplet-shaped spacetime anomaly associated with elevated pressure of inflationary vacuum state, and the ambient spacetime curvature, the spacetime curvature being the same as gravity, results in the gravitational imbalance, with the repulsion force pushing the space vehicle forward.

Figure 6:
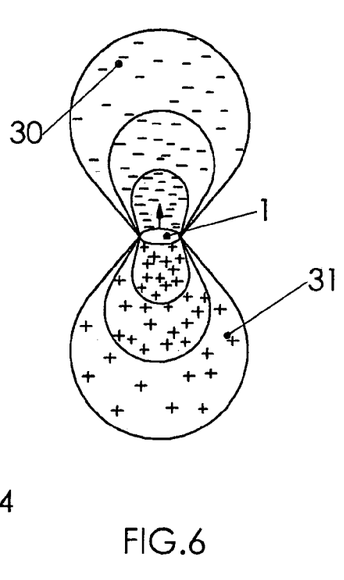

FIG. 6 illustrates the third example of spacetime curvature modification. This example shows the formation of the substantially droplet-shaped spacetime anomaly associated with lowered pressure of inflationary vacuum state 30 combined with the substantially droplet-shaped spacetime anomaly associated with elevated pressure of inflationary vacuum state 31. This combination of anomalies may be provided by the relative clockwise motion of the upper means for generating an electromagnetic field and relative clockwise motion of the hollow superconductive field, combined with the relative clockwise motion of the lower means for generating an electromagnetic field, as observed from above the space vehicle.

In this example, the difference between the spacetime curvature within the substantially droplet-shaped spacetime anomaly associated with lowered pressure of inflationary vacuum state, and the spacetime curvature of the substantially droplet-shaped spacetime anomaly associated with elevated pressure of inflationary vacuum state, the spacetime curvature being the same as gravity, results in the gravitational imbalance, with gravity pulling, and the repulsion force pushing, the space vehicle forward.

Figure 7A:
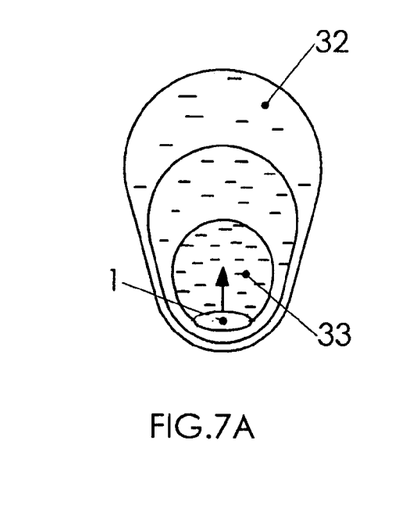

FIG. 7A illustrates the fourth example of spacetime curvature modification. This example shows the formation of a substantially egg-shaped spacetime anomaly associated with lowered pressure of inflationary vacuum state 32 around the hollow superconductive shield 1 of the space vehicle. The anomaly 32 is provided by the propagation of gravitomagnetic field of unequally-distributed density, this gravitomagnetic field radiating in all directions orthogonally away from the hollow superconductive shield. The propagation of the unequally-distributed gravitomagnetic field leads to the similarly unequally-distributed spacetime curvature anomaly. This unequally-distributed gravitomagnetic field may be provided by the relatively faster clockwise motion of the upper means for generating an electromagnetic field relative to the hollow superconductive field, combined with the relatively slower counterclockwise motion of the lower means for generating an electromagnetic field, as observed from above the space vehicle.

An area of the lowest vacuum pressure density 33 of the substantially egg-shaped spacetime anomaly associated with lowered pressure of inflationary vacuum state 32 is located directly in front of the space vehicle.

In this example, the variation in the spacetime curvature within the substantially egg-shaped spacetime anomaly associated with lowered pressure of inflationary vacuum state, the spacetime curvature being the same as gravity, results in a gravitational imbalance, with gravity pulling the space vehicle forward in modified spacetime.

Figure 7B:
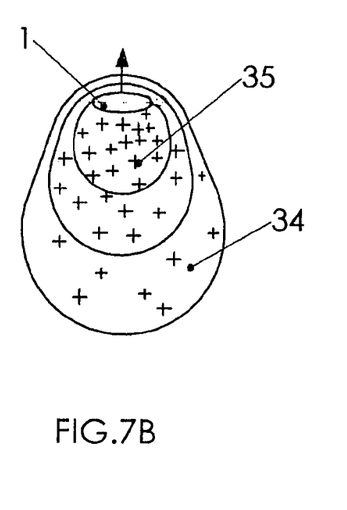

FIG. 7B illustrates the fifth example of spacetime curvature modification, also with the purpose of providing for a propulsion in modified spacetime. This example shows the formation of a substantially egg-shaped spacetime anomaly associated with elevated pressure of inflationary vacuum state 34 around the hollow superconductive shield 1 of the space vehicle. The anomaly 34 is provided by the propagation of gravitomagnetic field of unequally-distributed density, this gravitomagnetic field radiating in all directions orthogonally away from the hollow superconductive shield. The propagation of the unequally-distributed gravitomagnetic field leads to the similarly unequally-distributed spacetime curvature anomaly. This unequally-distributed gravitomagnetic field may be provided by the relatively slower counterclockwise motion of the upper means for generating an electromagnetic field relative to the hollow superconductive field, combined with the relatively faster clockwise motion of the lower means for generating an electromagnetic field, as observed from above the space vehicle.

An area of the highest vacuum pressure density 35 of the substantially egg-shaped spacetime anomaly associated with elevated pressure of inflationary vacuum state 34 is located directly behind the space vehicle.

In this example, the variation in the spacetime curvature within the substantially egg-shaped spacetime anomaly associated with elevated pressure of inflationary vacuum state, the spacetime curvature being same as gravity, results in a gravitational imbalance, with the repulsion force pushing the space vehicle forward in modified spacetime at speeds approaching the light-speed characteristic for this modified area. This light-speed might be much higher than the light-speed in the ambient space.

By creating alternative anomalies and modulating their parameters, the space vehicle's crew would dilate and contract time and space on demand. The space vehicle, emitting a vacuum pressure modifying, controllably-modulated gravitomagnetic field in all directions, would rapidly move in the uneven spacetime anomaly it created, pulled forward by gravity or pushed by the repulsion force. The time rate zone of the anomaly is expected to have multiple quantized boundaries rather than a single sudden boundary affecting space and time in the immediate proximity of the vehicle. Speed, rate of time, and direction in space could be shifted on demand and in a rapid manner. The modulated light-speed could make the space vehicle suitable for interstellar travel. Because of the time rate control in the newly created isospace, the accelerations would be gradual and the angles of deviation would be relatively smooth. The gravity shielding would further protect pilots from the ill-effects of gravity during rapid accelerations, directional changes, and sudden stops.

What is claimed is:

1. A space vehicle propelled by the pressure of inflationary vacuum state is claimed comprising:
   a hollow superconductive shield,
   an inner shield, the inner shield disposed inside said hollow superconductive shield, said inner shield comprising an upper shell and a lower shell,
   a support structure, the support structure disposed between said hollow superconductive shield and said inner shield concentrically to said hollow superconductive shield, said support structure comprised of an upper rotating element and a lower rotating element,
   upper means for generating an electromagnetic field, the upper means for generating an electromagnetic field disposed between said hollow superconductive shield and said upper shell, affixed to said upper rotating element at an electromagnetic field-penetrable distance to said hollow superconductive shield,
   lower means for generating an electromagnetic field, the lower means for generating an electromagnetic field disposed between said hollow superconductive shield and said lower shell, affixed to said lower rotating element at an electromagnetic field-penetrable distance to said hollow superconductive shield,
   electric motors, the electric motors disposed inside said hollow superconductive shield along the central axis of said hollow superconductive shield,
   a power source, the power source disposed inside said hollow superconductive shield, said power source electrically connected with said upper means for generating an electromagnetic field, said lower means for generating an electromagnetic field, and said electric motors,
   life-support equipment, the life-support equipment disposed inside said inner shield,
   a flux modulation controller, the flux modulation controller disposed inside said inner shield, said flux modulation controller in communication with said upper means for generating an electromagnetic field, said lower means for generating an electromagnetic field, said power source, and said electric motors, and
   a crew, the crew disposed inside said inner shield accessibly to said life-support and said flux modulation controller.

2. The space vehicle of claim 1 wherein said hollow superconductive shield is composed of a high-temperature ceramic superconductor with a composite crystal structure, and is cooled to a temperature of about 40 degrees K.

3. The space vehicle of claim 1 wherein said inner shield is composed of insulating materials such as foamed ceramics.

4. The space vehicle of claim 1 wherein said power source is a nuclear generator.

5. The space vehicle of claim 1 wherein said flux modulation controller is a computer.

6. The space vehicle of claim 1 wherein said upper rotating element and said lower rotating element are pivoted, urged to rotate by said upper means for generating an electromagnetic field, said lower means for generating an electromagnetic field, and said electric motors.

7. The space vehicle of claim 1 wherein said hollow superconductive shield is pivoted and urged to rotate by said upper means for generating an electromagnetic field, said lower means for generating an electromagnetic field, and said electric motors.

8. A method for generating pressure anomaly of inflationary vacuum state is claimed comprising the following steps, some occurring simultaneously:

provu a space vehicle comprising a hollow superconductive shield, an inner shield, a support structure, upper means for generating an electromagnetic field, lower means for generating an electromagnetic field, electric motors, a power source, life-support equipment, a flux modulation controller, and a crew, generating electrical energy in said power source, converting said electrical energy into an electromagnetic field in said upper means for generating an electromagnetic field and said lower means for generating an electromagnetic field, converting said electrical energy into mechanical energy in said electrical motors, rotating said upper means for generating an electromagnetic field and said lower means for generating an electromagnetic field relative to said hollow superconductive shield, converting said electromagnetic field into a gravitomagnetic field in said hollow superconductive shield, propagating said gravitomagnetic field outward, orthogonal to the walls of said hollow superconductive shield, and forming a pressure anomaly of inflationary vacuum state in the area of propagation of said gravitomagnetic field, the pressure anomaly of inflationary vacuum state comprised of an area of relatively lower vacuum pressure density in front of said space vehicle and an area of relatively higher vacuum pressure density behind said vehicle, whereby said space vehicle is urged to move from said area of relatively higher vacuum pressure density toward said area of relatively lower vacuum pressure density.

9. The method of claim 8 wherein said pressure anomaly of inflationary vacuum state is a substantially droplet-shaped anomaly associated with lowered pressure of inflationary vacuum state provided by the propagation of a gravitomagnetic field radiating orthogonally away from the front of said hollow superconductive shield, whereby providing for the gravitational imbalance where the lowered pressure of inflationary vacuum state is pulling said space vehicle forward.

10. The method of claim 8 wherein said pressure anomaly of inflationary vacuum state is a substantially droplet-shaped anomaly associated with elevated pressure of inflationary vacuum state provided by the propagation of a gravitomagnetic field radiating orthogonally away from the back of said hollow superconductive shield, whereby providing for the gravitational imbalance where the elevated pressure of inflationary vacuum state is pushing said space vehicle forward.

11. The method of claim 8 wherein said pressure anomaly of inflationary vacuum state is comprised of a substantially droplet-shaped anomaly associated with lowered pressure of inflationary vacuum state and a substantially droplet-shaped anomaly associated with elevated pressure of inflationary vacuum state, whereby providing for the gravitational imbalance where the lowered pressure of inflationary vacuum state is pulling, and the elevated pressure of inflationary vacuum state is pushing, said space vehicle forward.

12. The method of claim 8 wherein said pressure anomaly of inflationary vacuum state is a substantially egg-shaped anomaly associated with lowered pressure of inflationary vacuum state provided by the unequally-distributed gravitomagnetic field propagated in all directions orthogonally away from said hollow superconductive shield with an area of lowest vacuum pressure density disposed directly in front said space vehicle, whereby providing for the gravitational imbalance such that the lowered pressure of inflationary vacuum state is pulling said space vehicle forward in modified space-time.

13. The method of claim 8 wherein said pressure anomaly of inflationary vacuum state is a substantially egg-shaped anomaly associated with elevated pressure of inflationary vacuum state provided by the unequally-distributed gravitomagnetic field propagated in all directions orthogonally away from said hollow superconductive shield with an area of highest vacuum pressure density disposed directly behind said space vehicle, whereby providing for the gravitational imbalance such that the highest pressure of inflationary vacuum state is pushing said space vehicle forward in modified space-time at a speed possibly approaching a local light-speed, the local light-speed which may be substantially higher than the light-speed in the ambient space.

* * * * *